US00RE49513E

(19) United States
(12) Reissued Patent
Henniger

(10) Patent Number: US RE49,513 E
(45) Date of Reissued Patent: May 2, 2023

(54) BARBELL

(71) Applicant: Coulter Ventures, LLC., Columbus, OH (US)

(72) Inventor: William Henniger, Columbus, OH (US)

(73) Assignee: Coulter Ventures, LLC., Columbus, OH (US)

(21) Appl. No.: 29/817,674

(22) Filed: Dec. 2, 2021

Related U.S. Patent Documents

Reissue of:
(64) Patent No.: Des. 843,524
Issued: Mar. 19, 2019
Appl. No.: 29/605,895
Filed: May 31, 2017

U.S. Applications:
(63) Continuation of application No. 29/504,413, filed on Oct. 6, 2014, now abandoned.

(51) LOC (14) Cl. ..... 21-02
(52) U.S. Cl.
USPC ..... D21/694; D21/681
(58) Field of Classification Search
USPC ..... D21/662, 679, 680, 681, 682, 684, 694; D8/14, 107

(Continued)

(56) References Cited

U.S. PATENT DOCUMENTS 3,062,369 A * 11/1962 Guy ..... B65D 83/00 206/525
3,477,285 A * 11/1969 Bird ..... G01B 7/18 174/135

(Continued)

OTHER PUBLICATIONS

The Rogue Bar 2.0 by Rogue dated Aug. 14, 2014. https://www.roguefitness.com/the-rogue-bar-2-0.

(Continued)

*Primary Examiner* — Philip S Hyder
(74) *Attorney, Agent, or Firm* — Banner & Witcoff, Ltd.

(57) CLAIM

The ornamental design for a barbell, as shown and described.

DESCRIPTION

This application is an application for reissue of U.S. Pat. No. D843,524, issued Mar. 19, 2019, which corresponds to U.S. patent application Ser. No. 29/605,895, the entire contents of which are incorporated herein by reference. Application '895 is a continuation of U.S. pat. app. Ser. No. 29/504,413, filed Oct. 6, 2014, entitled Barbell, the entire contents of which is hereby incorporated by reference.

[FIG. 1 of the drawings is a front perspective view of the barbell with an elastic band positioned in the channel showing, in particular, the ornamental design thereof;]
[FIG. 2 of the drawings is a back perspective view thereof;]
[FIG. 3 of the drawings is a front elevational view thereof;]
[FIG. 4 of the drawings is a back elevational view thereof;]
[FIG. 5 of the drawings is a top plan view thereof;]
[FIG. 6 of the drawings is a bottom plan view thereof;]
[FIG. 7 of the drawings is a cross-sectional view taken generally about lines 7-7 of FIG. 3;]
[FIG. 8 of the drawings is a front perspective view of the barbell with the elastic band removed from the channel;]
[FIG. 9 of the drawings is a back perspective view thereof with the elastic band removed from the channel;]
[FIG. 10 of the drawings if a front elevational view thereof with the elastic band removed from the channel;]
[FIG. 11 of the drawings is a back elevational thereof with the elastic band removed from the channel; and]
[FIG. 12 of the drawings is a perspective view of the barbell having the elastic band positioned in the channel.]
*FIG. 13 is a front perspective view of a barbell showing my new design with the barbell depicted in a first state showing removable elastic bands located in channels;*
*FIG. 14 is an enlarged right side perspective detailed view thereof;*
*FIG. 15 is an enlarged left side perspective detailed view thereof;*

(Continued)

*FIG. 16 is an enlarged front detailed view thereof;*
*FIG. 17 is another enlarged front detailed view thereof;*
*FIG. 18 is a left side elevational view thereof;*
*FIG. 19 is a right side elevational view thereof;*
*FIG. 20 is a cross-sectional view taken about line 20-20 of FIG. 16;*
*FIG. 21 is a front perspective view of the barbell of FIGS. 13-20 shown with the elastic bands removed from the channels;*
*FIG. 22 is an enlarged right-side perspective detailed view corresponding to FIG. 14 showing the elastic band removed from the channel;*
*FIG. 23 an enlarged left-side perspective detailed view corresponding to FIG. 15 showing the elastic band removed from the channel;*
*FIG. 24 is an enlarged front detailed view corresponding to FIG. 16 with the elastic band removed from the channel;*
*FIG. 25 is an enlarged front detailed view corresponding to FIG. 17 with the elastic band removed from the channel; and,*
*FIG. 26 is a left side perspective detailed view thereof.*

1 Claim, 24 Drawing Sheets

Matter enclosed in heavy brackets [ ] appears in the original patent but forms no part of this reissue; matter printed in italics indicates the additions made by reissue.

(58) Field of Classification Search
CPC ..... A63B 21/0724; A63B 21/0726; A63B 21/0728; A63B 21/075
See application file for complete search history.

(56) References Cited

U.S. PATENT DOCUMENTS

| | | | | | |
|---|---|---|---|---|---|
| 3,895,466 | A | * | 7/1975 | Melton | F16L 55/11 137/800 |
| 4,274,323 | A | | 6/1981 | Resnicow | |
| D264,680 | S | | 6/1982 | Widen | |
| D303,494 | S | | 9/1989 | Lange | |
| D303,742 | S | | 10/1989 | Reid | |
| 4,893,810 | A | | 1/1990 | Lee | |
| D317,241 | S | | 6/1991 | Lent | |
| D332,030 | S | * | 12/1992 | Kauffman et al. | D7/624.1 |
| D332,385 | S | | 1/1993 | Adams | |
| 5,281,878 | A | * | 1/1994 | Schaeffer | H02K 7/14 310/87 |
| D346,821 | S | * | 5/1994 | Smith | 347/88 |
| 5,346,449 | A | | 9/1994 | Schlagel | |
| D400,406 | S | * | 11/1998 | House | D7/624.1 |
| 5,915,580 | A | * | 6/1999 | Melk | B65D 23/08 215/386 |
| D427,258 | S | * | 6/2000 | Sandoval | D21/681 |
| D428,084 | S | * | 7/2000 | Sandoval | D21/679 |
| D428,455 | S | * | 7/2000 | Sandoval | D21/679 |
| D429,221 | S | * | 8/2000 | Picozza | D13/168 |
| D433,468 | S | * | 11/2000 | Rojas | D21/680 |
| D434,655 | S | * | 12/2000 | Haugh | D9/434 |
| D437,015 | S | * | 1/2001 | Rojas | D21/679 |
| 6,386,992 | B1 | * | 5/2002 | Harris | A63B 37/0003 473/356 |
| D469,135 | S | * | 1/2003 | Bell | D21/662 |
| D480,969 | S | * | 10/2003 | Owens | 220/4.27 |
| D533,479 | S | | 12/2006 | Dubnicka | |
| D554,237 | S | * | 10/2007 | Lewis | D23/259 |
| D574,117 | S | * | 7/2008 | McGregory | D11/146 |
| D583,883 | S | * | 12/2008 | Thomas | D21/679 |
| 7,485,077 | B2 | | 2/2009 | Chen | |
| D596,452 | S | * | 7/2009 | Komorski | D7/387 |
| D611,524 | S | * | 3/2010 | Lawrence, III | D17/22 |
| D613,600 | S | * | 4/2010 | David | D9/456 |
| D628,056 | S | | 11/2010 | Busch | |
| D630,937 | S | | 1/2011 | Busch | |
| D644,073 | S | * | 8/2011 | Nottke | D7/697 |
| D663,196 | S | | 7/2012 | Bohnet et al. | |
| D685,865 | S | * | 7/2013 | Kuhn | D21/679 |
| 8,500,609 | B1 | * | 8/2013 | Williams | A63C 11/228 135/65 |
| D689,701 | S | * | 9/2013 | Mischel, Jr. | D6/309 |
| D725,722 | S | * | 3/2015 | Conaway | D21/679 |
| 9,114,279 | B2 | | 8/2015 | Murray et al. | |
| D746,168 | S | | 12/2015 | Vaughan et al. | |
| D749,889 | S | * | 2/2016 | Magistro | D7/354 |
| 9,375,601 | B2 | | 6/2016 | Miller et al. | |
| D763,658 | S | * | 8/2016 | Grasselli | D8/321 |
| D770,579 | S | | 11/2016 | Chang et al. | |
| D787,976 | S | * | 5/2017 | Jimenez | D11/81 |
| D795,971 | S | | 8/2017 | Patti | |
| D797,532 | S | | 9/2017 | Durand et al. | |
| D801,496 | S | * | 10/2017 | Letham | D23/336 |
| 10,004,972 | B2 | | 6/2018 | Young | |
| 10,195,476 | B2 | | 2/2019 | Jennings et al. | |
| D843,524 | S | | 3/2019 | Henniger | |
| D847,276 | S | | 4/2019 | Summers | |
| D862,617 | S | | 10/2019 | Henniger et al. | |
| D884,097 | S | | 5/2020 | Ameri et al. | |
| D887,246 | S | | 6/2020 | Chang | |
| D891,545 | S | | 7/2020 | Jones et al. | |
| D892,238 | S | | 8/2020 | Dunahay | |
| D892,240 | S | | 8/2020 | Sergakis | |
| 2008/0220952 | A1 | | 9/2008 | Yang | |
| 2012/0094810 | A1 | * | 4/2012 | Anderson | A63B 21/0724 482/107 |
| 2014/0045660 | A1 | * | 2/2014 | Murray | A63B 21/0724 482/106 |
| 2015/0038302 | A1 | | 2/2015 | O'Brien | |
| 2015/0343255 | A1 | * | 12/2015 | Miller | A63B 21/072 482/104 |
| 2017/0157489 | A1 | * | 6/2017 | Young | A63B 21/4035 |
| 2017/0216650 | A1 | * | 8/2017 | Simmons | A63B 21/055 482/107 |
| 2017/0216654 | A1 | * | 8/2017 | Parker | A63B 21/0722 482/107 |

OTHER PUBLICATIONS

Yaheetech, [online], [site visited Aug. 29, 2022]. Available on internet, URL:https://www.amazon.com/ <http://www.amazon.com/> Yaheetech-Olympic-Collars-Workout-Exercises/dp/B0172TDYK4/ref—Date of first sale represented as Oct. 24, 2015.
Sunny, [online], [site visited Aug. 29, 2022]. Available on internet, URL:https://www.amazon.com/ <http://www.amazon.com/> Sunny-Threaded-Chrome-Barbell-60-Inch/dp/B004EFYPBC/ref—Date of first sale represented as Nov. 25, 2010.
Rage fitness store, [online], [site visited Aug. 29, 2022]. Available on internet, URL:https://www.amazon.com/ <http://www.amazon.com/> Fitness-Olympic-Training-Barbell-Weightlifting/dp/B00R93GJ74/ref—Date of first sale represented as Dec. 19, 2014.
The Rogue Bar 2.0 by Rogue dated Aug. 4, 2014. Found online [Aug. 4, 2017] https://www.roguefitness.com/the-rogue-bar-2-0.*

* cited by examiner

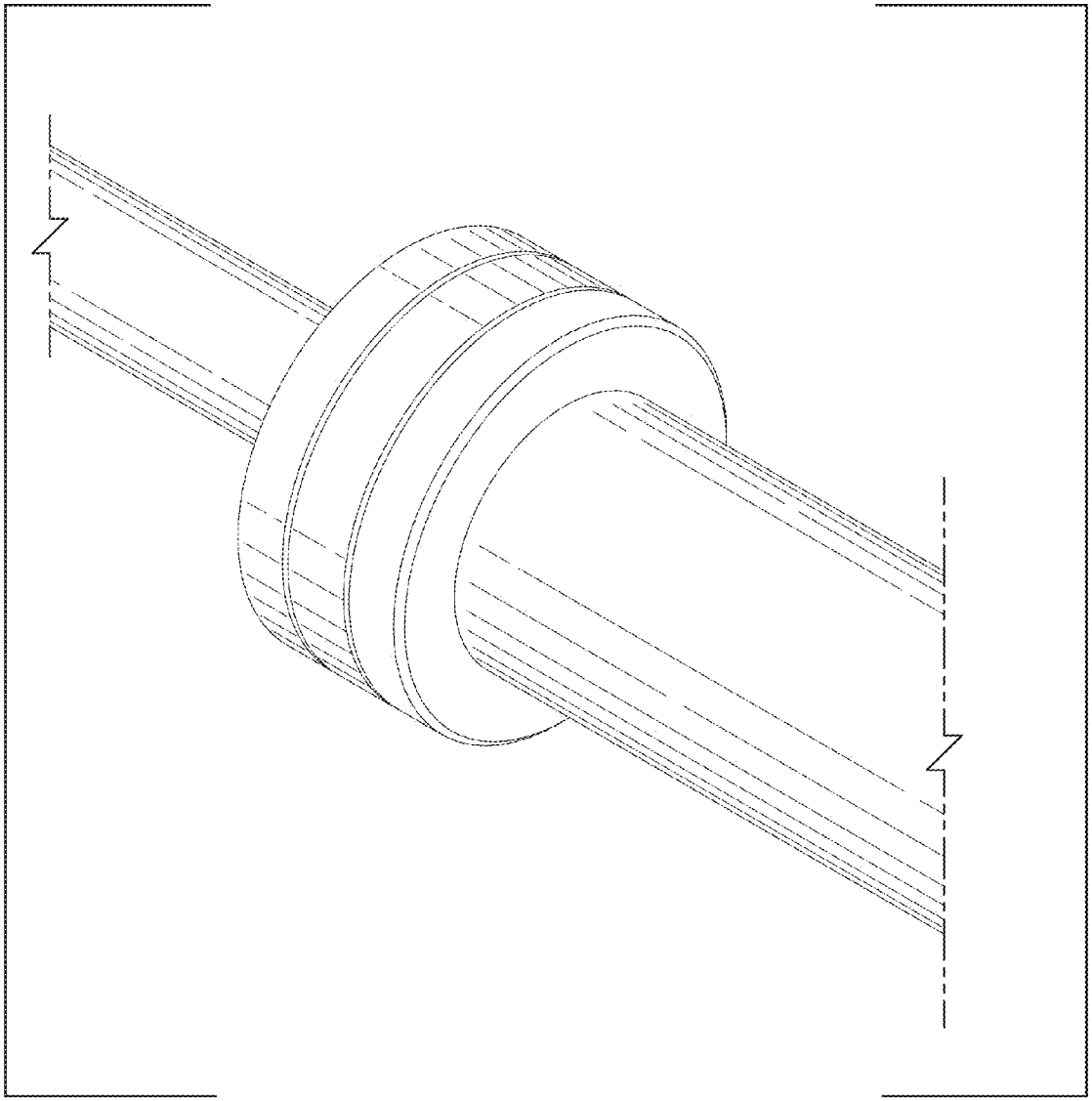
FIG. 1 (CANCELED)

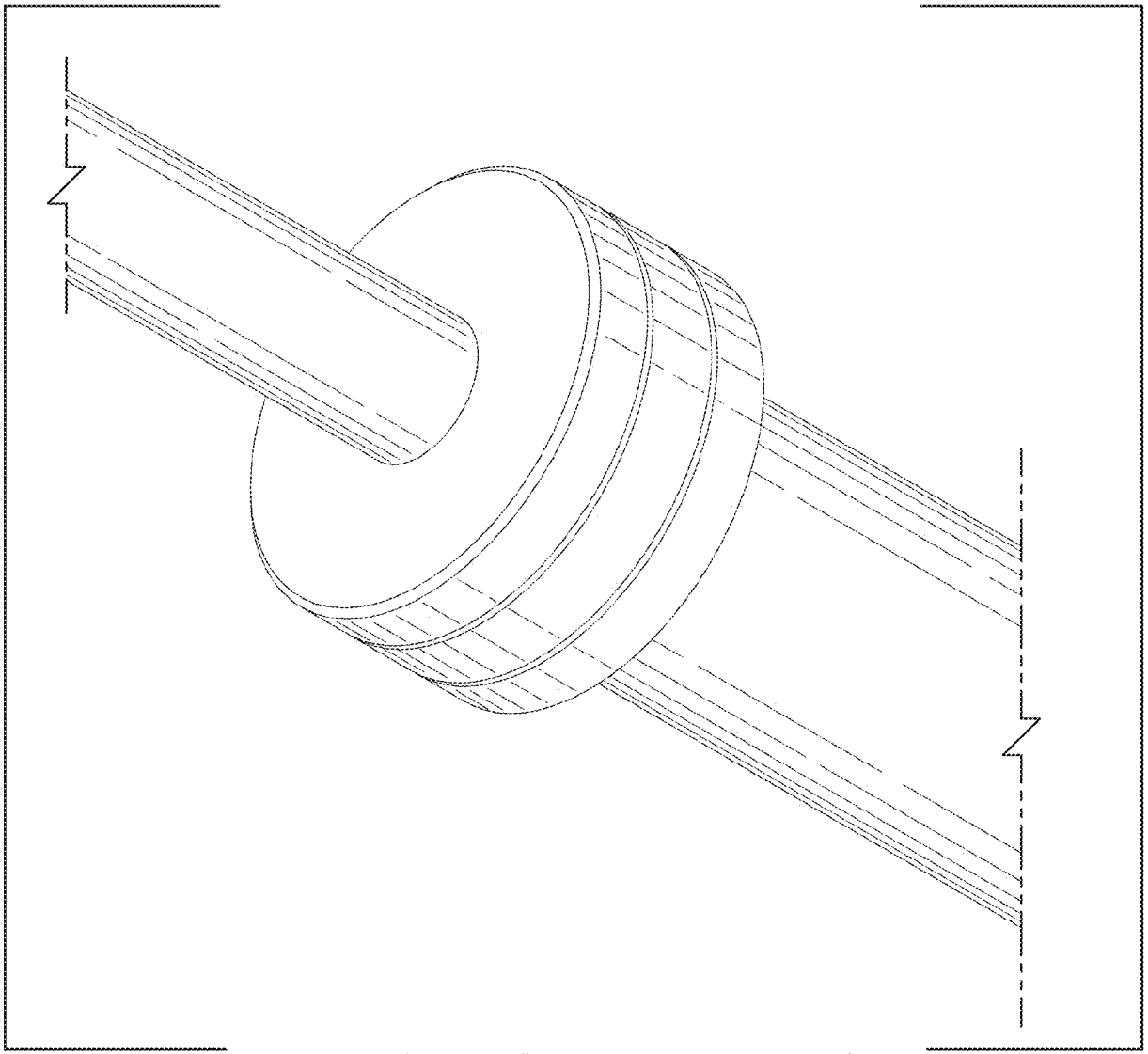
FIG. 2 (CANCELED)

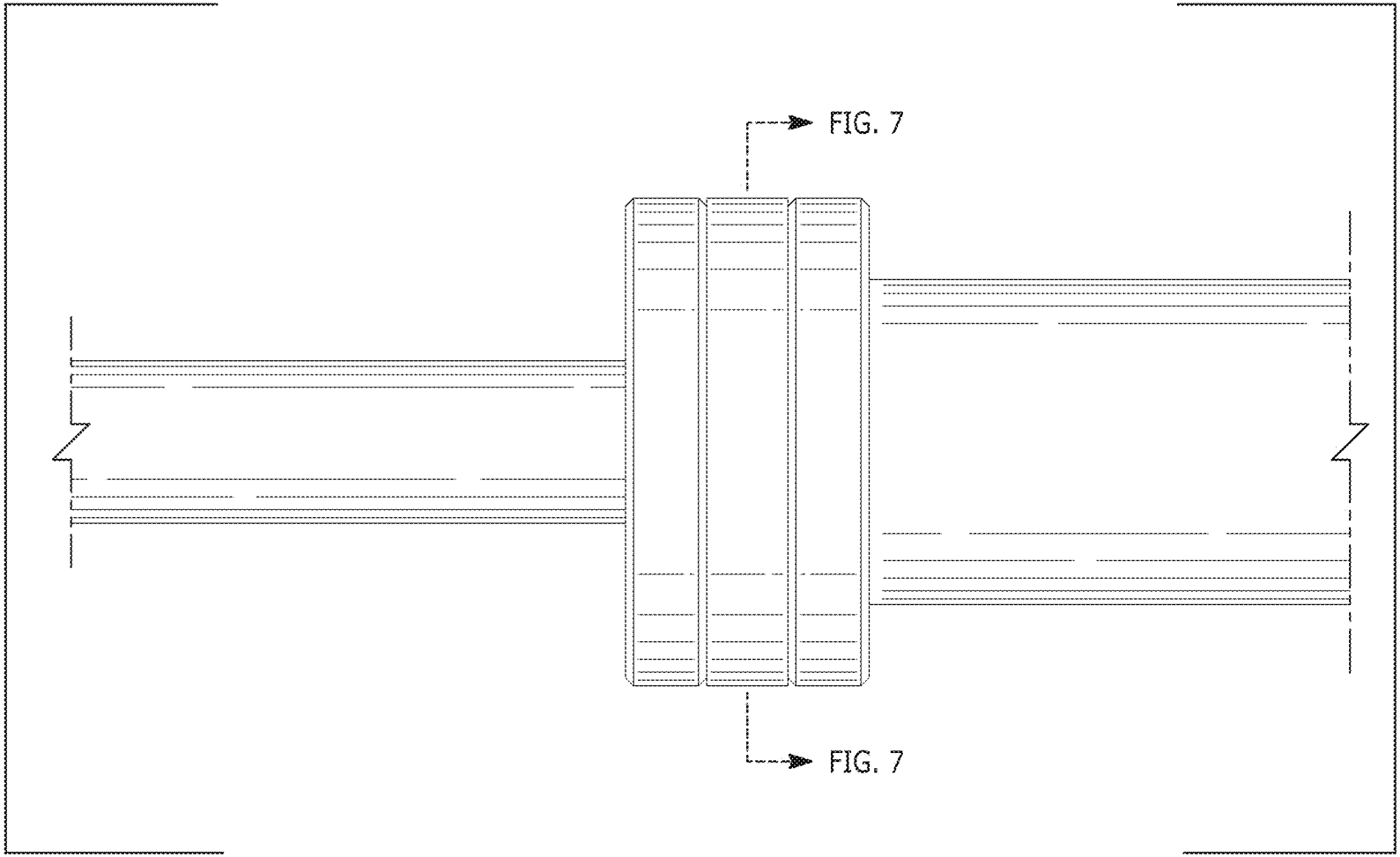
FIG. 3 (CANCELED)

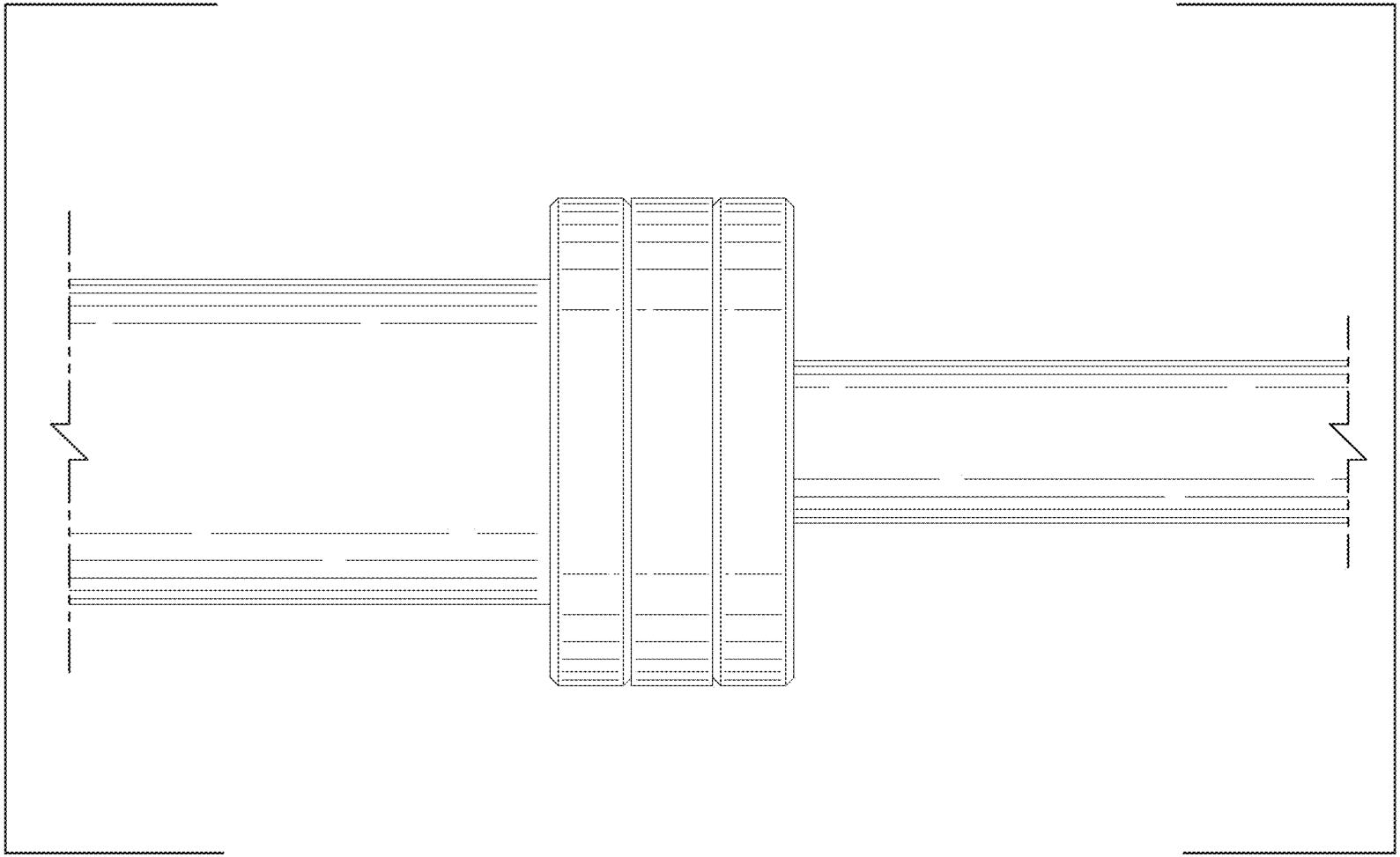
FIG. 4 (CANCELED)

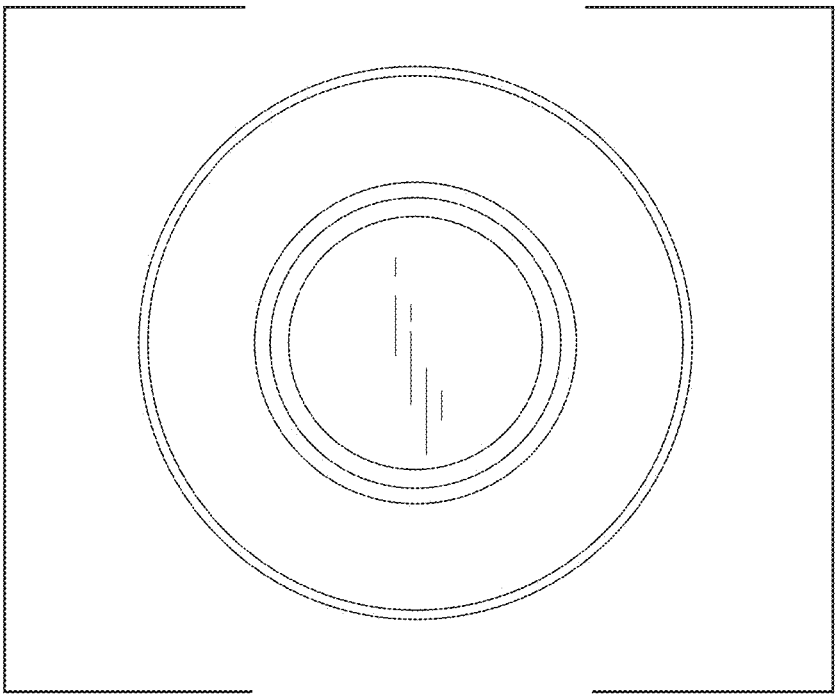
FIG. 5 (CANCELED)
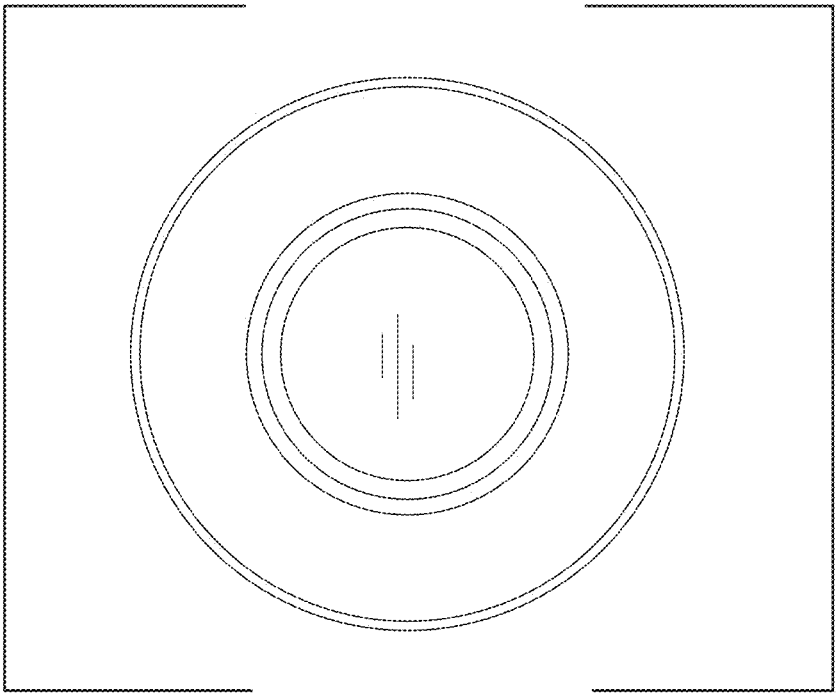
FIG. 6 (CANCELED)

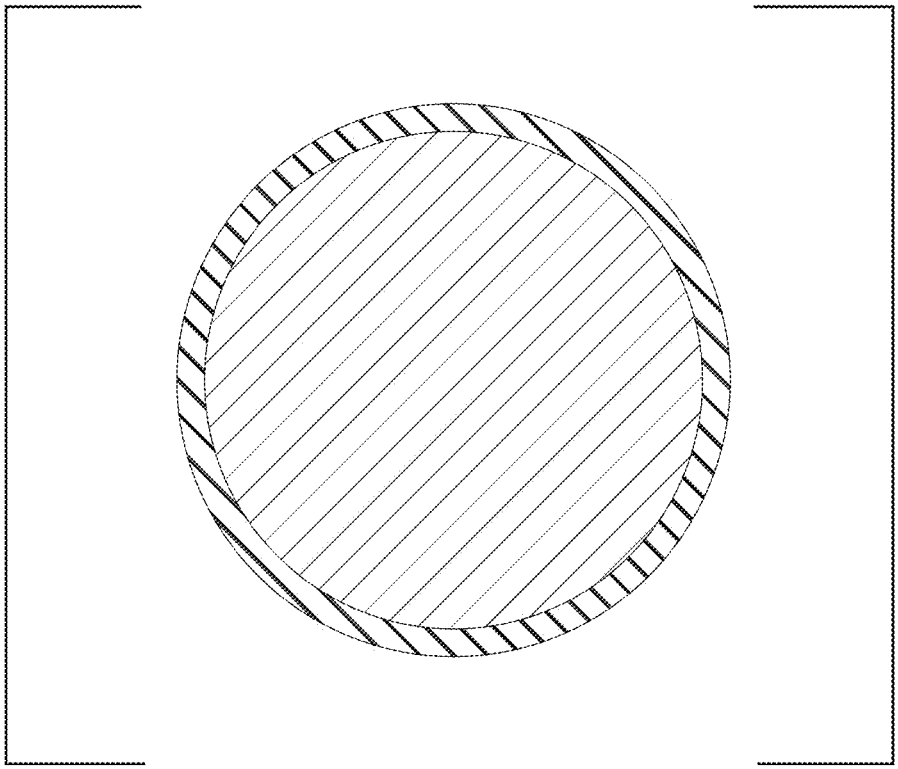
FIG. 7 (CANCELED)

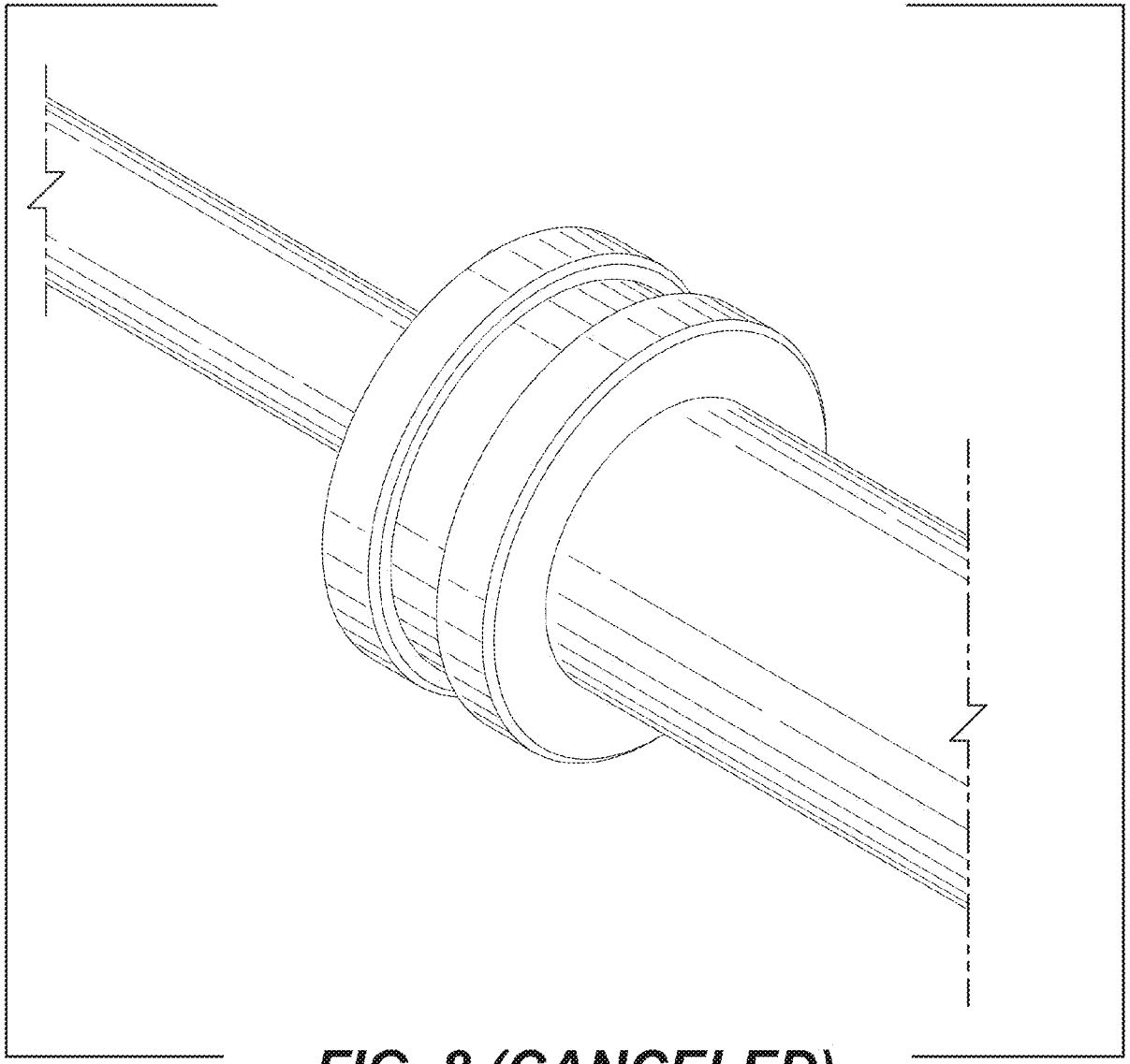
FIG. 8 (CANCELED)

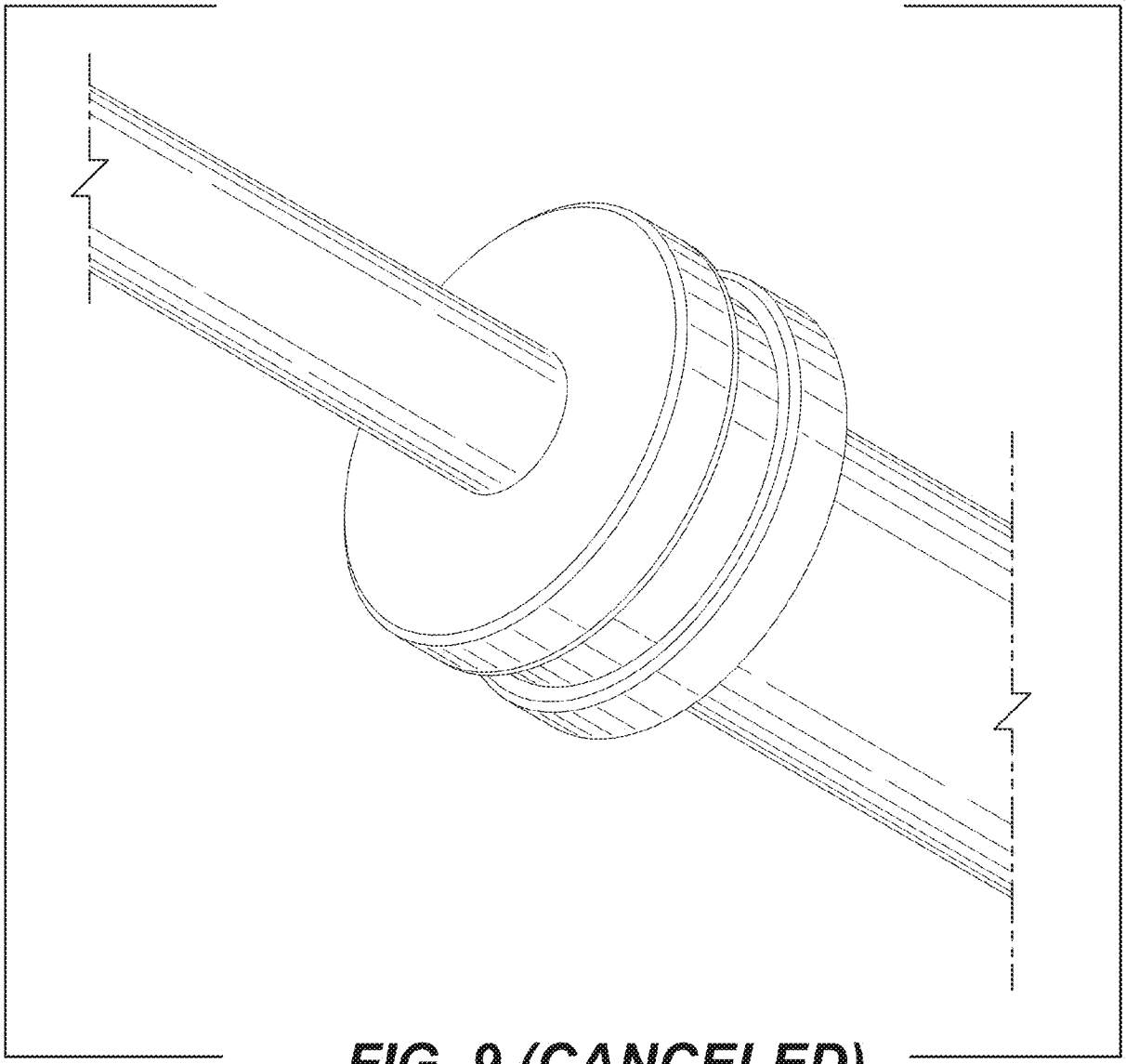
FIG. 9 (CANCELED)

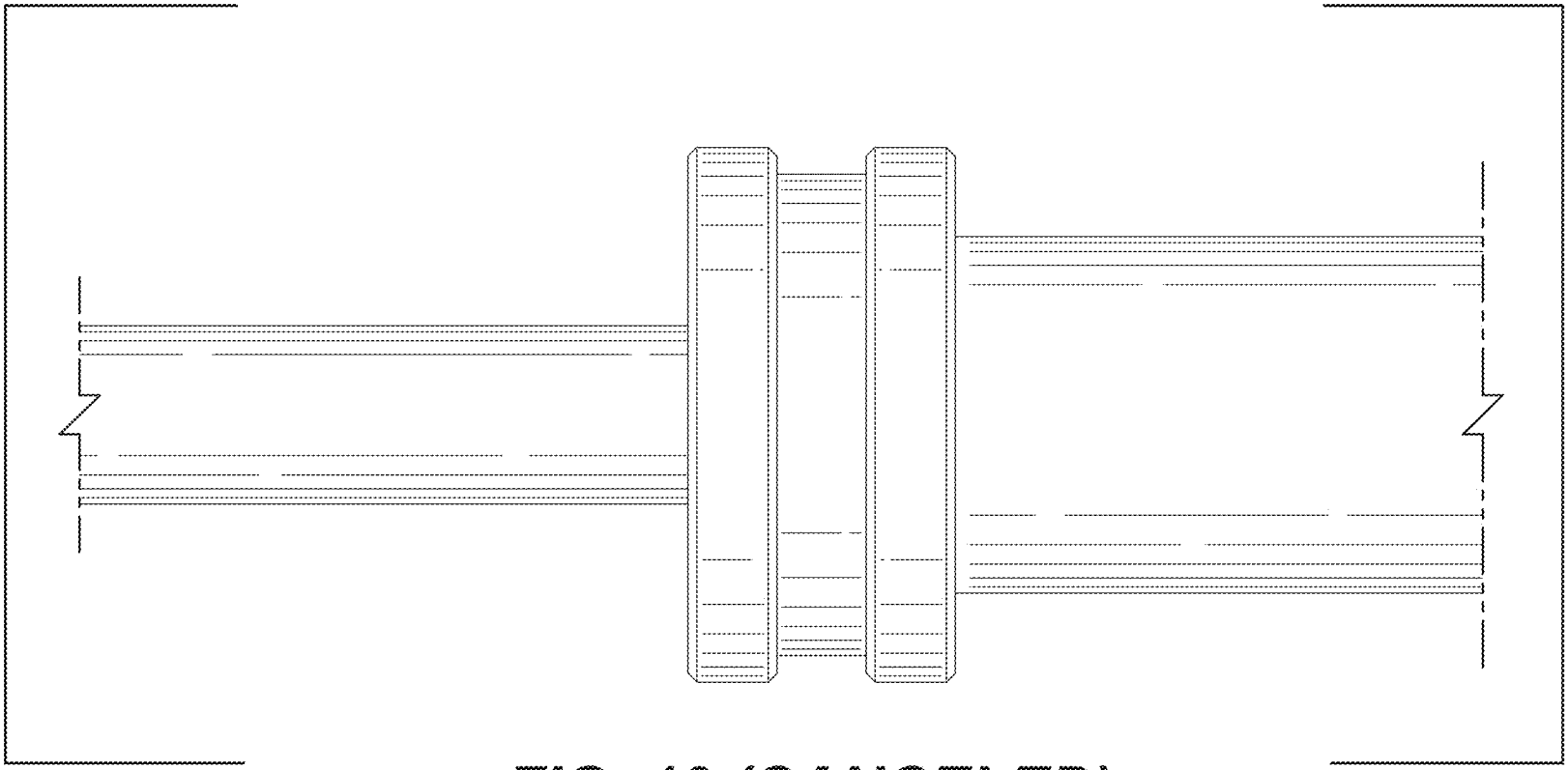
FIG. 10 (CANCELED)

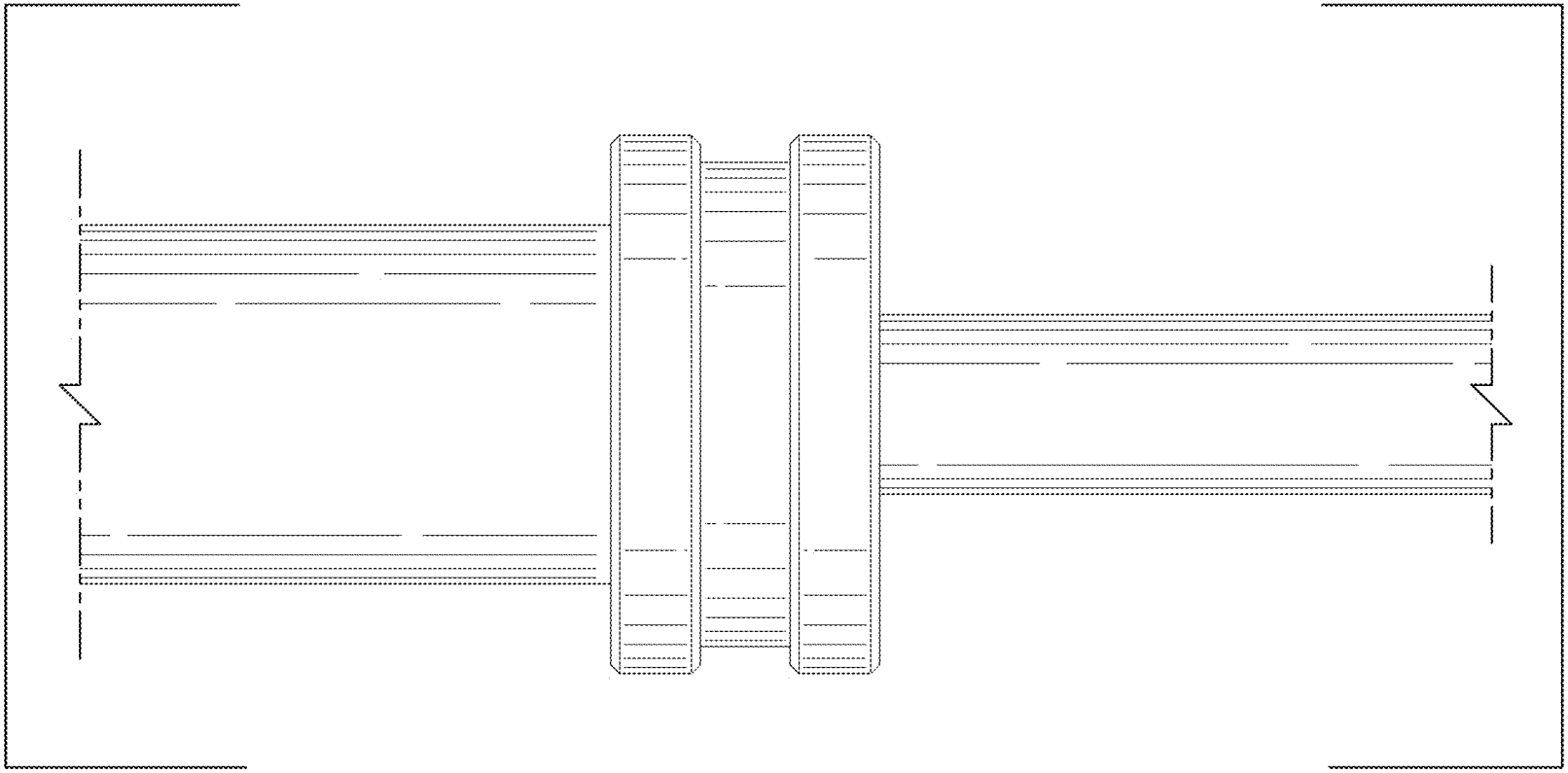
FIG. 11 (CANCELED)

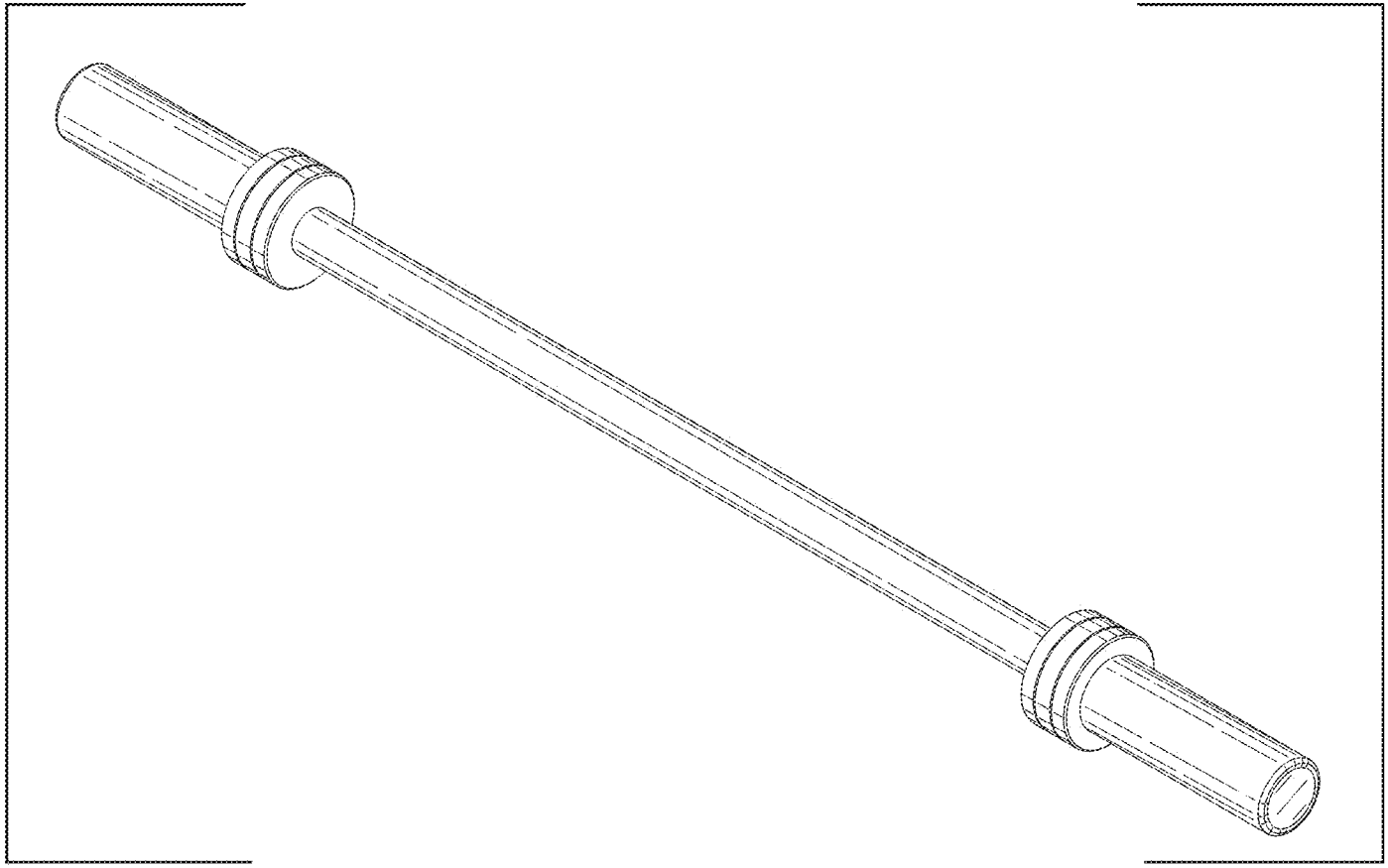
FIG. 12 (CANCELED)

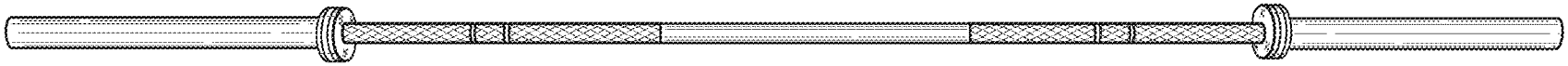
FIG. 13 (NEW)

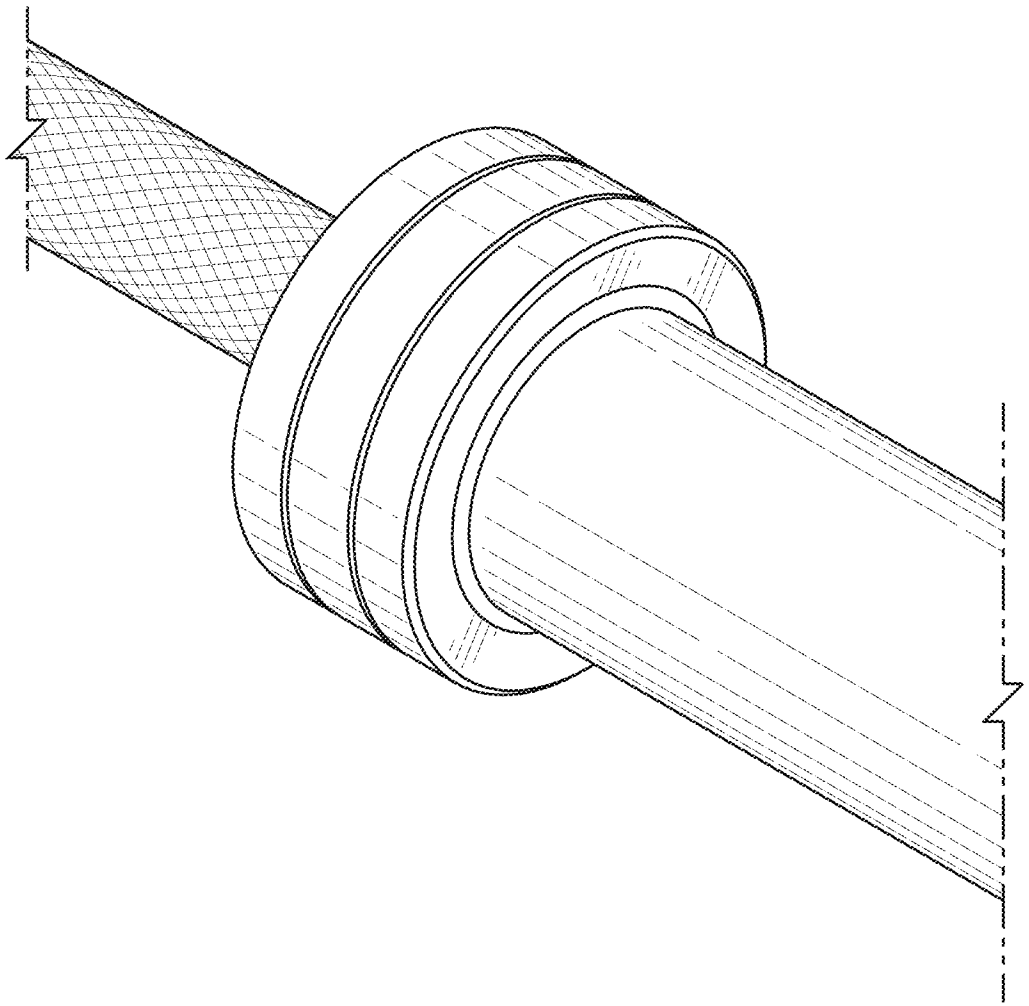
FIG. 14 (NEW)

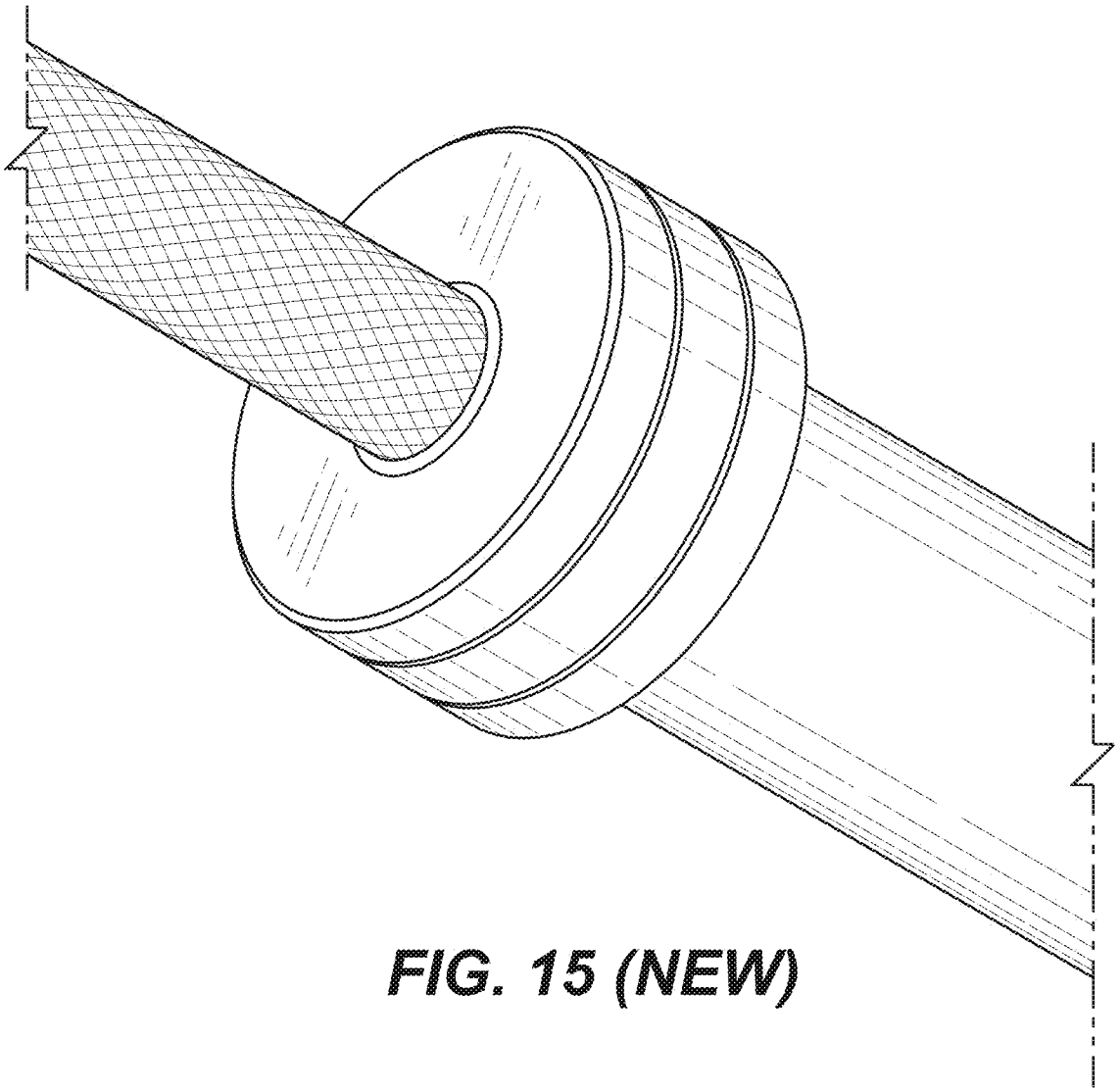
FIG. 15 (NEW)

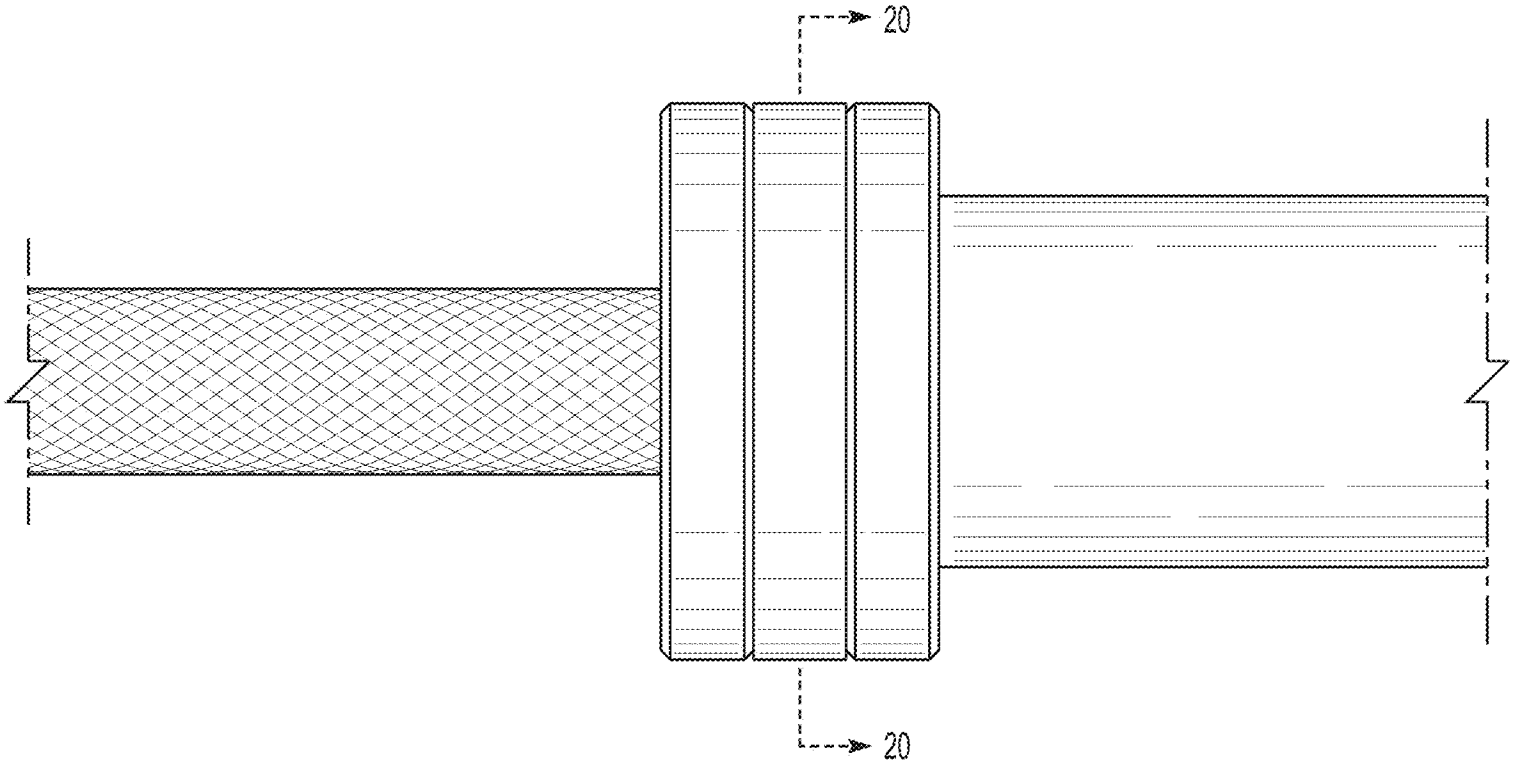
FIG. 16 (NEW)

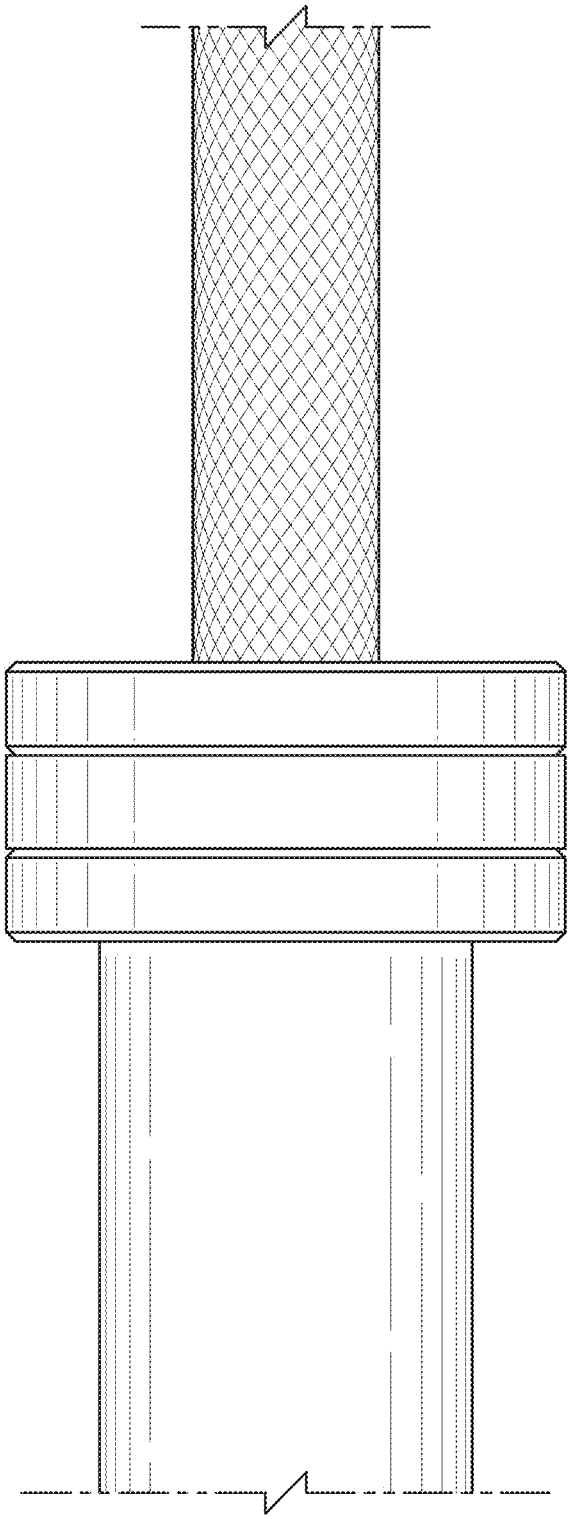
FIG. 17 (NEW)

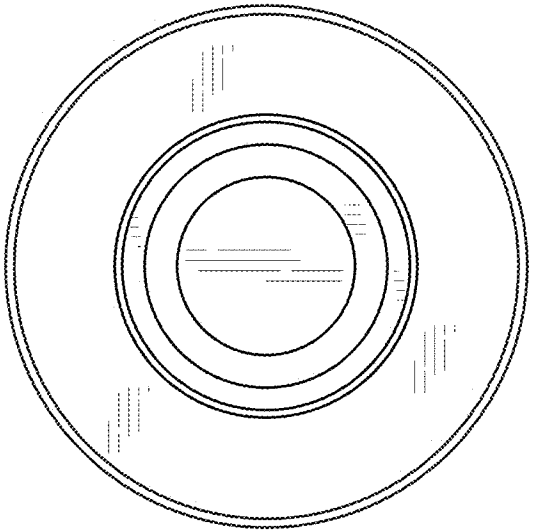
FIG. 19 (NEW)
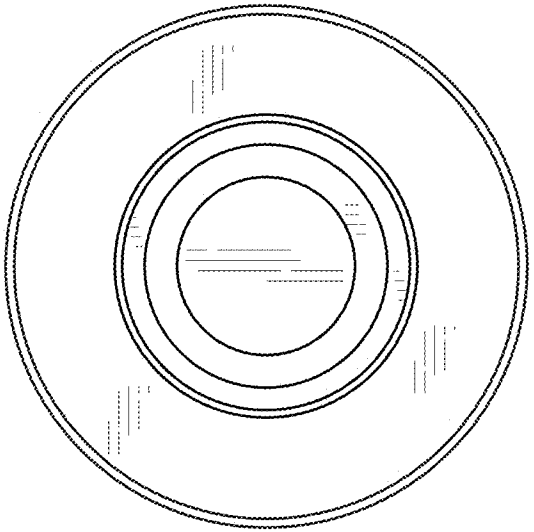
FIG. 18 (NEW)

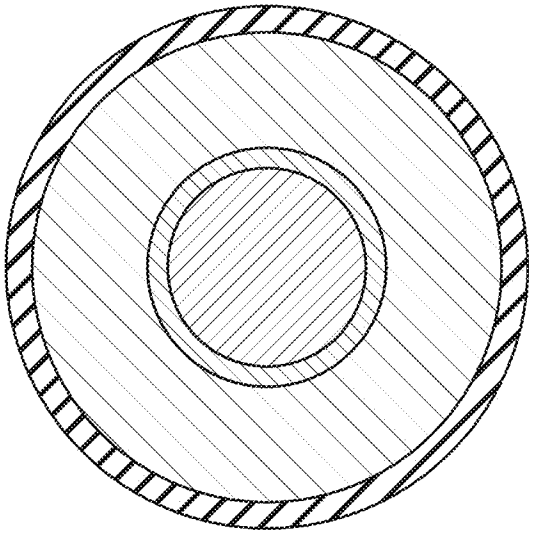
FIG. 20 (NEW)

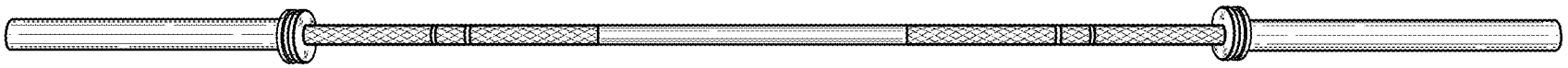
FIG. 21 (NEW)

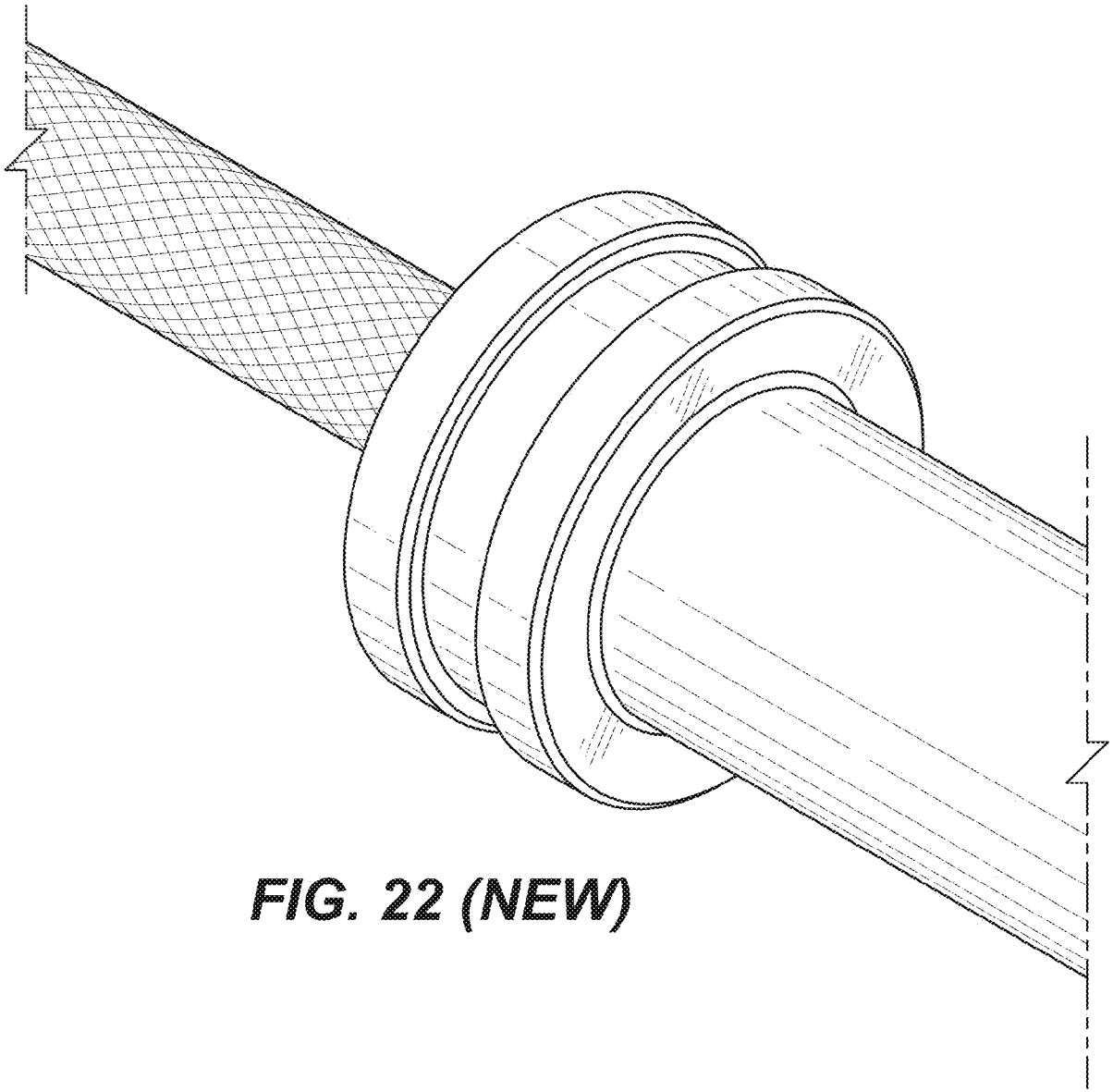
FIG. 22 (NEW)

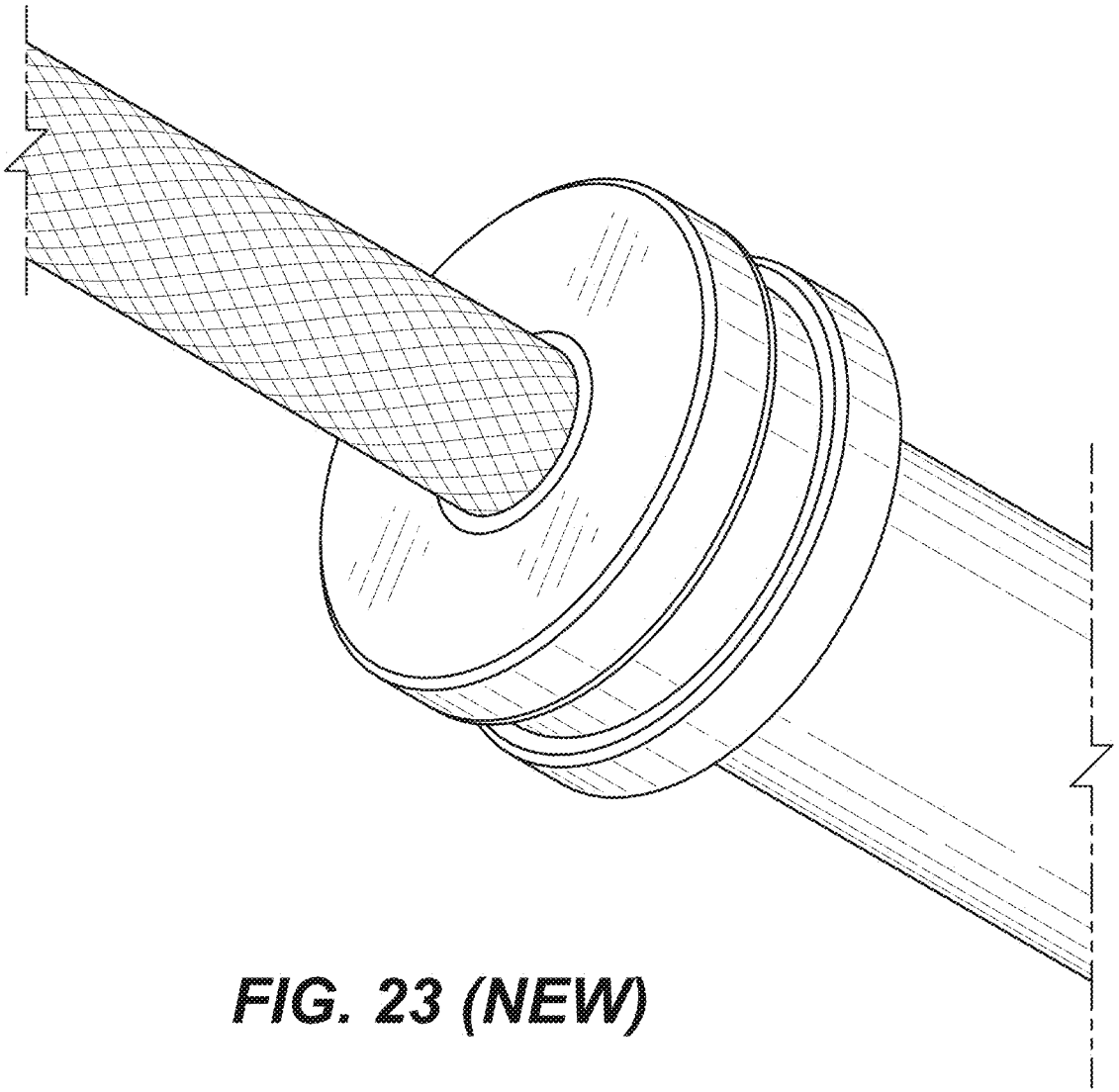
FIG. 23 (NEW)

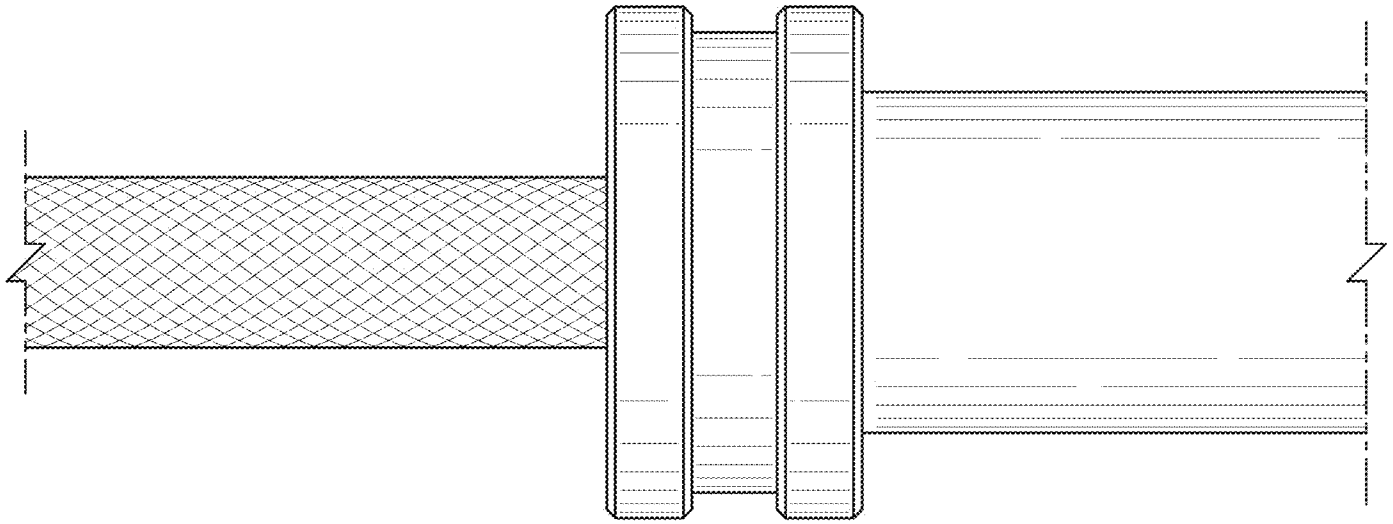
FIG. 24 (NEW)

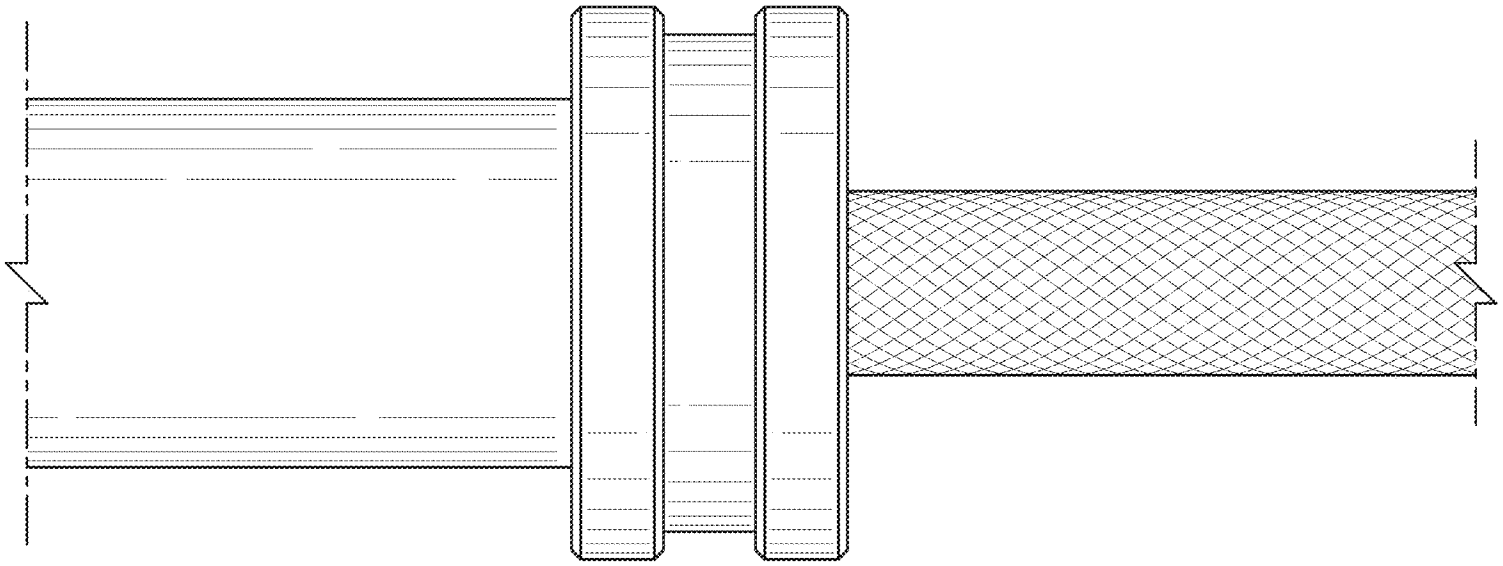
FIG. 25 (NEW)

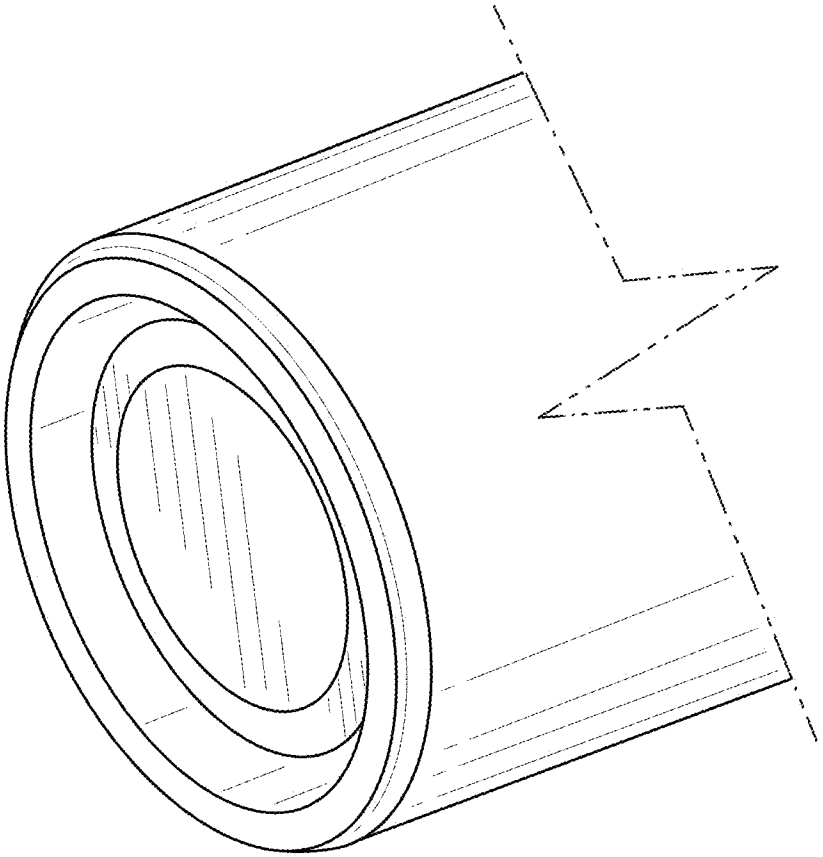
FIG. 26 (NEW)